United States Patent Office 3,514,798
Patented June 2, 1970

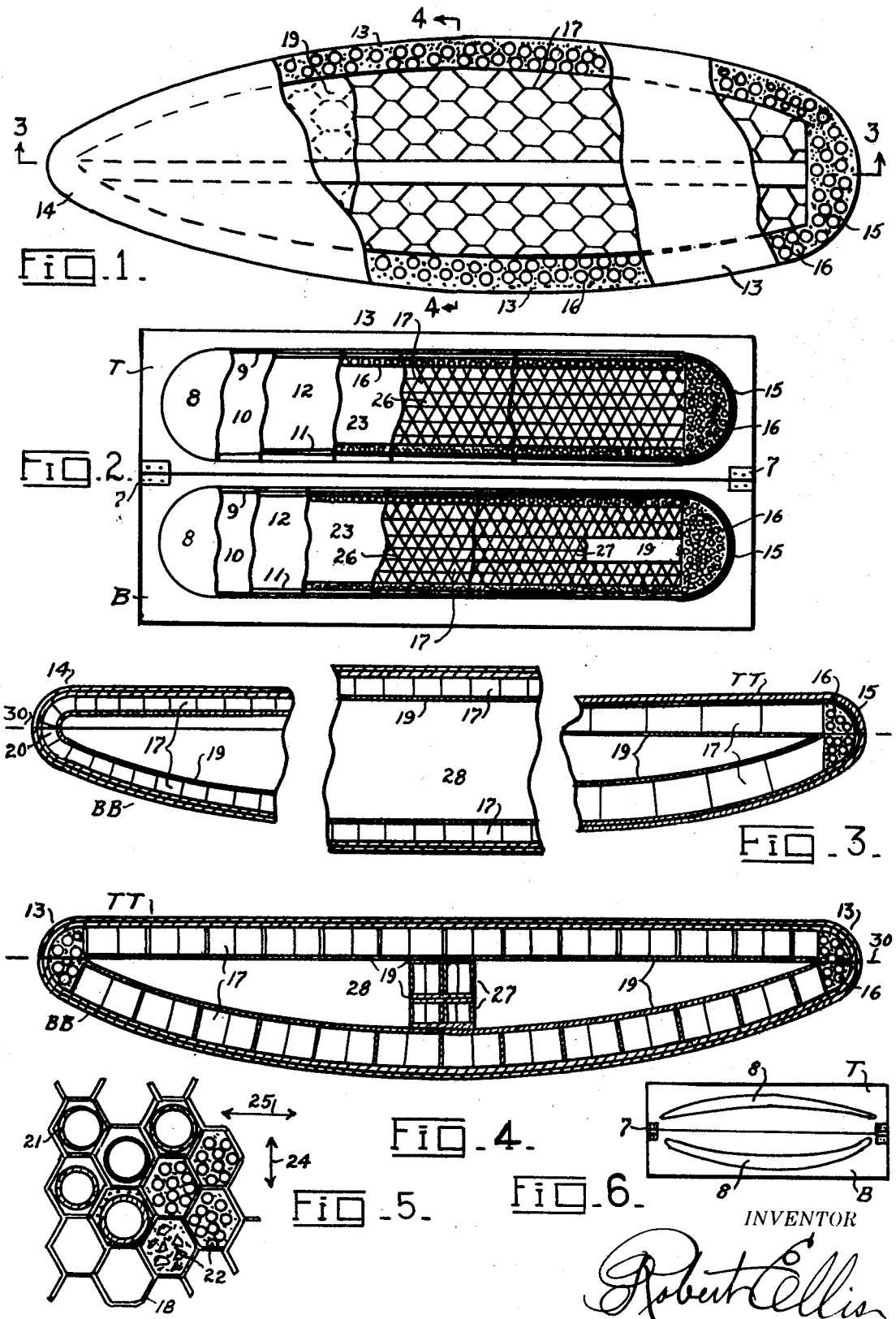

3,514,798
SURF-BOARD CONSTRUCTION AND
METHOD OF MAKING SAME
Robert Ellis, 350 Lomas Santa Fe Drive,
Solana Beach, Calif. 92075
Filed Feb. 1, 1968, Ser. No. 702,280
Int. Cl. A63c 15/02
U.S. Cl. 9—310                                            4 Claims

ABSTRACT OF THE DISCLOSURE

A surf-board in which the outer shell or skin is composed of solidified laminating polyester resin onto which, while the resin is still moist, is pressed a sheet of glass cloth which is then impregnated with the same resin. This occurs on the interior surface of each half of a mold having the configuration of the surf-board when mold is closed and onto this moist shell is pressed and secured thereto by adhesion a sheet of honey-comb material such as kraft liner board impregnated with a thermosetting phenolic resin. This honey-comb sheet can be bent quite sharply in one direction and is thus made to fit in place within the curvatures of the mold, the inner edges of the honey-comb adhering to the moist impregnated glass cloth while a skin or sheet of suitable paper or other suitable material is glued to the outer surfaces of the honey-comb material, and when hardened, a very rigid light-weight panel results permitting a considerable air space within the surf-board. Narrow parts of the surf-board may first be filled with hollow plastic balls, etc. first sprayed with polyester resin as a binder, to secure them together and to the sides of the surf-board.

---

This invention relates to surf-board construction and method of making same and the principal object of the invention is to make the board lighter in weight as well as stronger to resist the stresses absorbed by the board and also to cheapen the cost thereof.

Other and further objects will appear in the specifications and be specifically pointed out in the appended claims, reference being had to the accompanying drawings exemplifying the invention and in which:

FIG. 1 is a top view of the surf-board with parts broken away.

FIG. 2 is a top view showing the method of making the surf-board.

FIG. 3 is a longitudinal section on the line 3—3 of FIG. 1, in sections.

FIG. 4 is an enlarged cross-section on line 4—4 of FIG. 1.

FIG. 5 is an enlarged view of part of a honey-comb panel.

FIG. 6 is a top view showing an alternative method of molding the board.

Referring to the drawings in which like characters and numerals of reference refer to similar parts throughout the several views, the letters T and B denote the top and bottom parts respectively of the two halves of a mold having the desired configuration of a surf-board when closed, the two halves being preferably connected by hinges 7 whose use is obvious. Referring more particularly to FIG. 2, the numeral 8 denotes that part of the half molds not yet sprayed with the original coat of laminated polyester resin 9 as indicated in adjoining part 10. Onto this coat 9 is applied a sheet of glass cloth 11 impregnated laminated resin as shown in next adjoining part 12. Now, into the narrower rounded corners of the surf-board such as the rails 13 and front and rear ends 14 and 15 respectively, I apply a quantity of hollow plastic balls 16 or its equivalent filler such as solidified granulated polyurethane foam, all the granules being sprayed with laminated polyester resin to bind them together and to the interior surface of the surf-board shell. This now leaves a considerable hollow space 28 within the surf-board with quite thin top and bottom sides. To strengthen these areas I place a top and bottom panel of honey-comb material 17 as shown in next adjoining part 26, the lower edges of the honey-comb cells 18 being preferably pressed into the still tacky glass cloth 11 to which it will strongly adhere when dry while the opposite upper edges of the honey-comb cells are covered with a thin binding skin or sheet 19 which has been glued on that side, thus creating a panel of great structural strength and of very light weight. A thinner panel of honey-comb material may be applied to curves of rather small radius as indicated at 20 in FIG. 3. In addition, the cells 18 of the honey-comb panel may be filled with either a single closely fitting filler such as the hollow plastic ball 21 or a large number of hardened granular foam material 22, see FIG. 5, for increasing the strength in any weaker parts of the surf-board. Previous to applying the skin 19 to the honey-comb cells 18, the honey-comb material can be readily bent in the directions of arrow 24 but difficult in the directions of arrow 25, this being due to two sides of each cell being parallel with arrow 25. The sheet or skin 19 is then glued, after bending into place, to the outer edges of the cells.

Referring again to FIG. 2, I show a narrow longitudinal upstanding reinforcing panel 27 of honey-comb material running from front to rear of the surf-board within the hollow space 28, the upper surface of this narrow panel contacting the lower face of the upper honey-comb panel 17 while the lower surface of panel 27 rests upon the upper face of the lower honey-comb panel 17, this construction forming a very strong and extremely light weight surf-board. A sheet or skin 19 also binds the cells of the reinforcing panel 27. A single thicker and larger celled panel could fill the hollow space 28.

To complete the surf-board, the upper half mold T is now swung upward by virtue of hinges 7, and then downward over and onto the lower half of the mold B while the laminating resins are still moist and a short wait will cause same to harden and bind all parts together into a solidified lightweight surf-board when the upper half mold T is swung open. Grease or other releasing material, not indicated in the drawing, is smeared over the interior surfaces of both halves of the mold previous to the first spraying of the laminating polyester resin 9 so that the surf-board may be easily removed from the mold. The half TT of the surf-board as shown above line 30 would match half mold T while half BB of the surf-board would match half mold B.

FIG. 6 shows an alternative method of making the molds, the line 30 in this instance would be the longitudinal center of the surf-board in a vertical plane instead of in a horizontal plane as herein shown. While I have shown the dividing line 30 of the two half sections as being straight and horizontal, this line may be curved or angular to conform to the slight cavity of many boards.

From the foregoing description it will be apparent that I have evolved a surf-board and method of making same which is extremely light in weight and extra strong and, as the honey-comb material resists decay, moisture, pests and fungi the board will last a longer time than with other boards now in use where plastic foam is employed as a core and, where this honey-comb material cannot be used in the narrow parts of the board, I use lightweight hollow plastic granules bonded together and to the board with a thin spray of laminating resin.

Various changes may be made in the embodiment of the invention hereinabove specifically described without departing from or sacrificing the advantages of the invention.

I claim:

1. A surf-board comprising a relatively thin outer shell and a core within said shell, said core comprising a longitudinally disposed panel of hony-comb construction, said core being secured to the inside surface of said outer shell, the said honey-comb panel being divided, one part of said panel being attached to the underside of the top part of the said surf-board shell and the other part of the panel being attached to the bottom side of said surf-board to form a longitudinal cavity in the interior of said shell between the parts of said panel when they are secured together.

2. A surf-board comprising a relatively thin outer shell and a core within said shell, said core comprising a longitudinally disposed panel of honey-comb construction, the said honey-comb panel being divided into half parts, one part of the panel being attached to the upper interior side of said thin outer shell of said surf-board while the other part of the honey-comb panel is attached to the lower interior side of said thin outer shell of said surf-board to form a longitudinal cavity therein when said half parts are secured together, and a longitudinally disposed re-inforcing panel of honey-comb material spaced between said upper and lower half panels.

3. A surf-board comprising a relatively thin outer shell and a core within said shell, said core comprising a longitudinally disposed panel of honey-comb construction, said core being divided into half parts, one part being attached to the upper interior side of said thin outer shell of said surf-board while the other half part is attached to the lower interior side of said thin outer shell of said surf-board, to form a longitudinal hollow cavity within, and a filler for the narrower interior crevices in said surf-board which crevices are inconvenient to be filled by said honey-comb core, the said filler consisting of a quantity of light-weight particles having an outer covering of adhesive such as laminating polyester resin and adapted to adhere to said particles and to the inner surface of said surf-board.

4. A surf-board comprising a relatively thin outer shell and a core within said shell, said core comprising a longitudinally disposed panel of honey-comb construction, the said honey-comb panel being divided into approximately half parts, one part of the panel being attached to the upper interior side of said surf-board thin outer shell while the other half of the panel is attached to the lower interior side of said surf-board thin outer shell to form a longitudinal cavity therein, the said upper and lower panels being secured to each other all along their meeting edges.

References Cited
UNITED STATES PATENTS

| | | | |
|---|---|---|---|
| 2,794,756 | 6/1957 | Leverenz | 161—43 |
| 3,276,784 | 10/1966 | Anderson | 9—310 |

MILTON BUCHLER, Primary Examiner

J. E. PITTENGER, Assistant Examiner